United States Patent
Shah et al.

(10) Patent No.: US 11,157,349 B2
(45) Date of Patent: Oct. 26, 2021

(54) SYSTEMS AND METHODS FOR PRE-BOOT BIOS HEALING OF PLATFORM ISSUES FROM OPERATING SYSTEM STOP ERROR CODE CRASHES

(71) Applicant: Dell Products L.P., Round Rock, TX (US)

(72) Inventors: Arifullah Syed Shah, Irving, TX (US); Ibrahim Sayyed, Georgetown, TX (US); Steven A. Downum, Pflugerville, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/779,879

(22) Filed: Feb. 3, 2020

(65) Prior Publication Data
US 2021/0240561 A1   Aug. 5, 2021

(51) Int. Cl.
*G06F 11/00*   (2006.01)
*G06F 11/07*   (2006.01)
*G06F 13/20*   (2006.01)

(52) U.S. Cl.
CPC ...... *G06F 11/0793* (2013.01); *G06F 11/0745* (2013.01); *G06F 11/0751* (2013.01); *G06F 13/20* (2013.01)

(58) Field of Classification Search
CPC ............ G06F 11/0793; G06F 11/0745; G06F 11/0751; G06F 11/0778; G06F 13/20
See application file for complete search history.

(56) References Cited

U.S. PATENT DOCUMENTS

| | | | |
|---|---|---|---|
| 5,974,546 A * | 10/1999 | Anderson | G06F 11/2284 713/2 |
| 6,640,316 B1 * | 10/2003 | Martin | G06F 11/1417 714/2 |
| 7,734,945 B1 * | 6/2010 | Levidow | G06F 11/0793 714/3 |
| 8,793,538 B2 * | 7/2014 | Etaati | G06F 11/0751 714/45 |
| 2018/0004591 A1 * | 1/2018 | Volentine | G06F 11/073 |
| 2018/0074884 A1 * | 3/2018 | Cady | G06F 11/0787 |
| 2019/0278651 A1 * | 9/2019 | Thornley | G06F 11/0772 |
| 2019/0340063 A1 * | 11/2019 | Chao | G06F 9/4401 |

* cited by examiner

*Primary Examiner* — Anthony J Amoroso
(74) *Attorney, Agent, or Firm* — Jackson Walker L.L.P.

(57) ABSTRACT

An information handling system may include a processor and a basic input/output system comprising a program of instructions executable by the processor and configured to cause the processor to determine if a captured stop error code captured in connection with an operating system stop error occurring during a previous boot session of the information exists on a memory accessible to the basic input/output system and responsive to the captured stop error code existing on the memory, read the captured stop error code and perform a remedial action based on the captured stop error code.

21 Claims, 2 Drawing Sheets

SYSTEMS AND METHODS FOR PRE-BOOT BIOS HEALING OF PLATFORM ISSUES FROM OPERATING SYSTEM STOP ERROR CODE CRASHES

TECHNICAL FIELD

The present disclosure relates in general to information handling systems, and more specifically to healing an information handling system from operating system stop error code crashes.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In some instances, an information handling system may incur what is sometimes referred to as a "Blue Screen of Death." A "Blue Screen of Death" may occur when an operating system (e.g., Microsoft Windows) encounters a "STOP Error." The STOP Error is often the result of low-level software (or drivers) crashing and/or faulty hardware components of the information handling system. This critical failure causes an operating system to crash and stop working. Such failure can lead to data loss, as programs executing on the information handling system may not have a chance to save their open data.

When a blue screen error occurs, Windows may automatically create a "minidump" file that includes information about the crash and saves it to a storage resource of the information handling system. Information from such minidump file may help to identify the cause of the blue screen when the information handling system boots to a recovery image. For example, the recovery image may read the minidump file and initiate startup repairs. If there is any blue screen error code related to hardware failures which are not fixable while repairing the operating system registry, then the recovery image may initiate platform basic input/output system (BIOS) setup.

Once BIOS setup is initiated, a user may not know what to do in response to BIOS setup menus, and thus may not be able to adequately repair the BIOS or other components of the information handling system.

In some instances, in response to a blue screen error, some information handling systems may boot to an original equipment manufacturer (OEM)-specific service operating system or otherwise provide an OEM-specific diagnostic tool. In such instances, the service operating system may attempt to determine the cause of the failure and repair it. Repairs attempted by a service operating system may not be a relevant fix for the issue causing the blue screen error. In addition, if the issue causing the blue screen error remains, the service operating system diagnostic may continue to perform the same repeated steps in an attempt to solve the issue. In situations where it is unable to resolve the issue, a service operating system may offer solutions such as a restore point, installation of a new OS, and/or other solutions. However, for any issues related to platform firmware and/or BIOS that cause blue screen errors, traditional approaches do not provide any direct, automated method to repair such issues.

SUMMARY

In accordance with the teachings of the present disclosure, the disadvantages and problems associated with recovering from an operating system stop error have been reduced or eliminated.

In accordance with embodiments of the present disclosure, an information handling system may include a processor and a basic input/output system comprising a program of instructions executable by the processor and configured to cause the processor to determine if a captured stop error code captured in connection with an operating system stop error occurring during a previous boot session of the information exists on a memory accessible to the basic input/output system and responsive to the captured stop error code existing on the memory, read the captured stop error code and perform a remedial action based on the captured stop error code.

In accordance with these and other embodiments of the present disclosure, a method may include determining, with a basic input/output system of an information handling system, if a captured stop error code captured in connection with an operating system stop error occurring during a previous boot session of the information exists on a memory accessible to the basic input/output system, and responsive to the captured stop error code existing on the memory, reading the captured stop error code and performing a remedial action based on the captured stop error code.

In accordance with these and other embodiments of the present disclosure, an article of manufacture may include a computer readable medium and computer-executable instructions carried on the computer readable medium, the instructions readable by a processor, the instructions, when read and executed, for causing the processor to, in a basic input/output system of an information handling system, determine if a captured stop error code captured in connection with an operating system stop error occurring during a previous boot session of the information exists on a memory accessible to the basic input/output system, and responsive to the captured stop error code existing on the memory, read the captured stop error code and perform a remedial action based on the captured stop error code.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
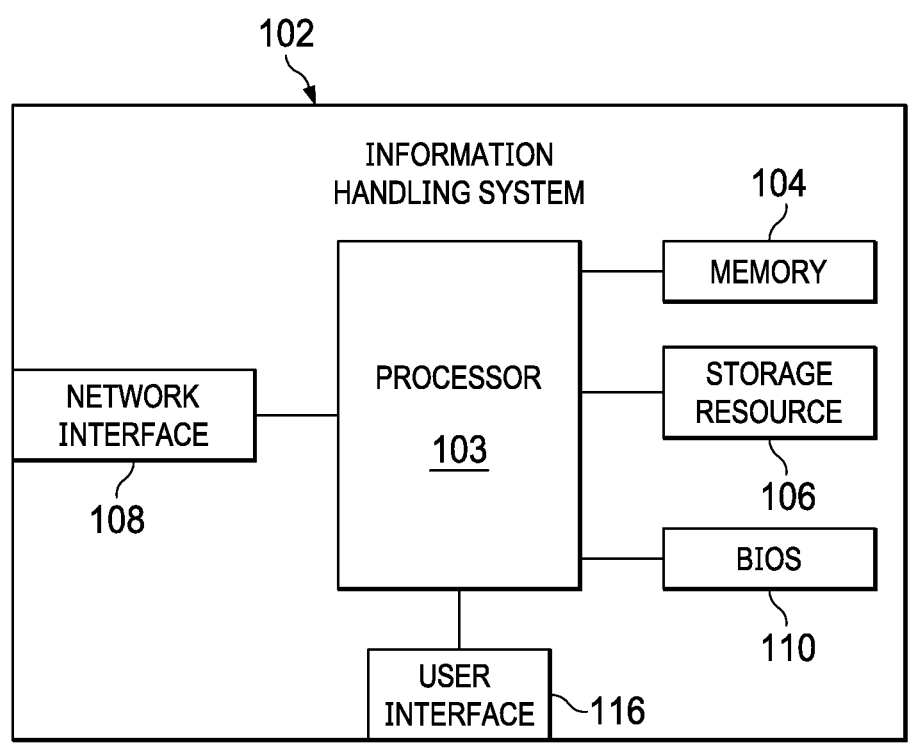
FIG. 1 illustrates a block diagram of an example information handling system adapted for preboot healing of platform issues that cause operating system stop error code crashes, in accordance with certain embodiments of the present disclosure.
Figure 2:
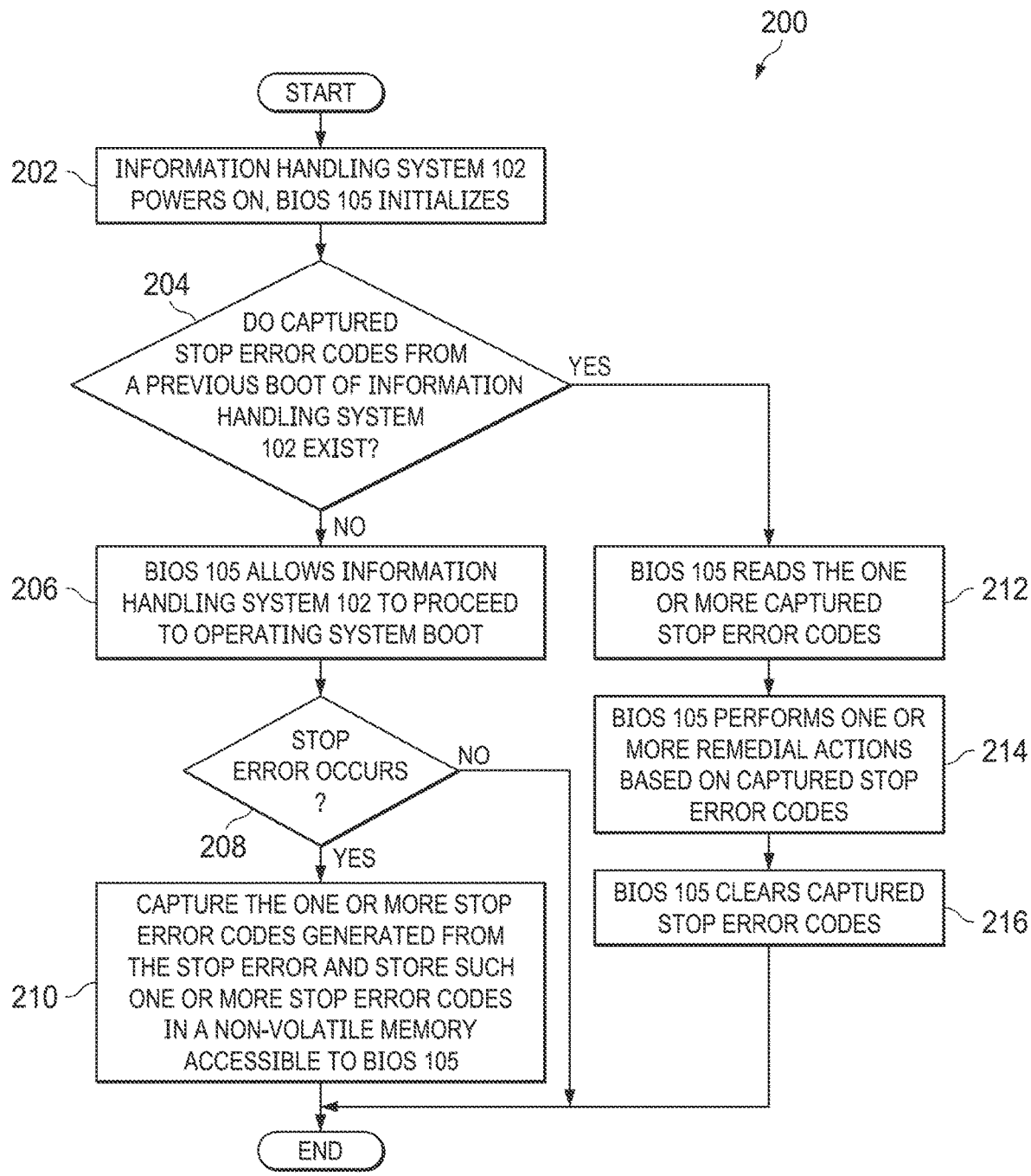
FIG. 2 illustrates a flow chart of an example method for preboot healing of platform issues that cause operating system stop error code crashes, in accordance with certain embodiments of the present disclosure.

Preferred embodiments and their advantages are best understood by reference to FIGS. 1 and 2, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more busses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), busses, memories, I/O devices and/or interfaces, storage resources, network interfaces, motherboards, and/or any other components and/or elements of an information handling system.

FIG. 1 illustrates a block diagram of an example information handling system 102 adapted for preboot healing of platform issues that cause operating system stop error code crashes, in accordance with certain embodiments of the present disclosure. In some embodiments, information handling system 102 may be a server. In other embodiments, information handling system 102 may be a personal computer (e.g., a desktop computer or a portable computer). As depicted in FIG. 1, information handling system 102 may include a processor 103, a memory 104 communicatively coupled to processor 103, a storage resource 106 communicatively coupled to processor 103, a network interface 108 communicatively coupled to processor 103, a basic input/output system (BIOS) 110 communicatively coupled to processor 103, and a user interface 116 coupled to processor 103.

Processor 103 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104, storage resource 106, BIOS 110, and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Storage resource 106 may be communicatively coupled to processor 103 and may include any system, device, or apparatus configured to retain program instructions or data for a period of time (e.g., a computer-readable medium). In some embodiments, storage resource 106 may include a hard disk drive, a magnetic tape library, an optical disk drive, a magneto-optical disk drive, a compact disc drive, a solid state storage drive, a flash drive and/or any other suitable computer-readable medium. As its name suggests, storage resource 106 is intended to reside internal to a chassis or other enclosure comprising information handling system 102 and not be readily accessible without opening such chassis or other enclosure.

Network interface 108 may comprise any suitable system, apparatus, or device operable to serve as an interface between information handling system 102 and a network comprising one or more other information handling systems. Network interface 108 may enable information handling system 102 to communicate over such a network using any suitable transmission protocol and/or standard, including without limitation, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network interface 108 may interface with one or more networks implemented as, or as part of, a storage area network (SAN), personal area network (PAN), local area network (LAN), a metropolitan area network (MAN), a wide area network (WAN), a wireless local area network (WLAN), a virtual private network (VPN), an intranet, the Internet or any other appropriate architecture or system that facilitates the communication of signals, data and/or messages (generally referred to as data). In certain embodiments, network interface 108 may comprise a network interface card, or "NIC."

BIOS 110 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 110 may be implemented as a program of instructions that may be read by and executed on processor 103 to carry out the functionality of BIOS 110. In these and other embodiments, BIOS 110 may comprise boot firmware configured to be the first code executed by processor 103 when information handling system 102 is booted and/or powered on. As part of its initialization functionality, BIOS code may be configured to set components of information handling system 102 into a known state, so that one or more applications (e.g., an operating system or other application programs) stored on compatible media (e.g., memory 104) may be executed by processor 103 and given control of information handling system 102. As described in greater detail below, BIOS 110 may further be configured to perform functionality for preboot healing of platform firmware and/or BIOS issues that may cause stop error code crashes.

User interface 116 may comprise any instrumentality or aggregation of instrumentalities by which a user may interact with information handling system 102. For example, user interface 116 may permit a user to input data and/or instructions into information handling system 102 (e.g., via a keyboard, pointing device, and/or other suitable component), and/or otherwise manipulate information handling system 102 and its associated components. User interface 116 may also permit information handling system 102 to communicate data to a user, e.g., by way of a display device.

In operation, when a stop error occurs, BIOS 110 may capture stop error codes generated from the stop error (e.g., stop error codes present in the minidump) via a standard interface (e.g., Windows Management Interface, Advanced Configuration of Power Interface, UEFI variable services, etc.). Upon a subsequent reboot of information handling system 102 following the stop error, and prior to booting of an operating system of information handling system 102, BIOS 110 may read the captured stop error codes and perform a remedial action based on the captured stop error codes. For example, based on the stop error codes, BIOS 110 may perform one or more of the following remedial actions:

Return BIOS settings to default levels or return to a known good BIOS configuration (if available) in which the last operating system boot of information handling system 102 was successful;

Initiate an update to BIOS firmware if a new version is available;

Perform diagnostic tests to identify any hardware resources (e.g., corrupt memory 104, failed storage resource 106, failed video, etc.) that may be causing the stop error;

Cause initiation of a service operating system and communicate the captured stop error codes to enable the service operating system to attempt to identify and repair problems leading to the stop error; and Communicate suggestions to a user (e.g., via user interface 116) to perform in an attempt to eliminate stop errors on the next operating system boot (e.g., reseating of memory modules, expansion cards, other hardware, etc.).

FIG. 2 illustrates a flow chart of an example method 200 for preboot healing of platform issues that cause operating system stop error code crashes, in accordance with certain embodiments of the present disclosure. According to one embodiment, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, information handling system 102 may power on, and BIOS 110 may initialize. At step 204, BIOS 110 may determine if captured stop error codes from a previous boot of information handling system 102 exist. If captured stop error codes from a previous boot of information handling system 102 do not exist, method 200 may proceed to step 206. Otherwise, if captured stop error codes from a previous boot of information handling system 102 exist, method 200 may proceed to step 212.

At step 206, in the absence of captured stop error codes from a previous boot of information handling system 102, BIOS 110 may allow information handling system 102 to proceed to operating system boot. At step 208, during execution of the operating system of information handling system 102, the operating system, BIOS 110, and/or another component may determine if an operating system stop error occurs. If a stop error occurs, method 200 may proceed to step 210. Otherwise, in the absence of a stop error, method 200 may end.

At step 210, in response to occurrence of an operating system stop error, the operating system, BIOS 110, and/or another component may capture the one or more stop error codes generated from the stop error and store such one or more stop error codes in a non-volatile memory accessible to BIOS 110. For example, when an operating system stop error occurs, a bug check handler of the operating system may capture the stop error code and may write the code to a reserved Advanced Configuration and Power Interface (ACPI) memory area. An ACPI handler of BIOS 110 may read such ACPI memory error, may issue a system management interrupt (SMI) to store the stop error code in a non-volatile memory which will be accessible to BIOS 110 during a subsequent boot of information handling system 102, and an SMI handler of BIOS 110 may store the stop error code accordingly. After step 210, method 200 may end, after which information handling system 102 may restart and method 200 may execute again from step 202.

At step 212, in response to captured stop error codes from a previous boot of information handling system 102 existing in a memory accessible to BIOS 110, BIOS 110 may read the one or more captured stop error codes. At step 214, BIOS 110 may perform one or more remedial actions based on the one or more captured stop error codes. The table below sets forth example stop error codes and a remedial action that may be taken by BIOS 110 in response to such code.

| Stop Error Code | Remedial Action |
| --- | --- |
| 0x000000F6 | Revert to default BIOS configuration |
| 0x000000A5 | Perform BIOS firmware update (if available) |
| 0x000000E0 | Perform BIOS firmware update (if available) |
| 0x00000018 | Revert to known good BIOS configuration |
| [Secure boot violation] | Revert to default secure boot database keys |

In addition to the example remedial actions set forth above, in some embodiments, BIOS 110 may, as a remedial action, cause initiation of a service operating system and communicate the captured stop error codes to enable the service operating system to attempt to identify and repair problems leading to the stop error. In addition or alternatively, BIOS 110 may, as a remedial action, communicate suggestions to a user (e.g., via user interface 116) to perform in an attempt to eliminate stop errors on the next operating system boot (e.g., reseating of memory modules, expansion cards, other hardware, etc.).

At step 216, BIOS 110 may clear the captured one or more stop error codes. After step 216, method 200 may end, after which information handling system 102 may restart and method 200 may execute again from step 202.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a processor; and
   a basic input/output system comprising a program of instructions executable by the processor and configured to cause the processor to:
   perform preboot stop error handling operations, wherein the preboot stop error handling operations include:
   following a reboot of the information handling system and prior to booting an operating system, detecting a stop error code stored in a memory accessible to the basic input/output system, wherein the stop error code corresponds to an operating system stop error occurring prior to the reboot; and
   responsive to detecting the stop error code:
   reading the stop error code; and
   performing a remedial action based on the stop error code.

2. The information handling system of claim 1, wherein the preboot stop error handling operations include:
   responsive to detecting no stop error code stored in the memory, allowing the information handling system to boot the operating system; and
   in the event of an operating system stop error occurring following the boot of the operating system, and in concert with the operating system, capturing a stop error code corresponding to the operating system stop error and storing the stop error code in the memory.

3. The information handling system of claim 1, wherein the remedial action comprises returning configuration settings of the basic input/output system to a known good configuration corresponding to a most recent successful boot of the operating system.

4. The information handling system of claim 1, wherein the remedial action comprises initiating a basic input/output system firmware update.

5. The information handling system of claim 1, wherein the remedial action comprises performing diagnostic tests to identify any hardware information handling resources of the information handling system that potentially caused the operating system stop error.

6. The information handling system of claim 1, wherein the remedial action comprises communicating the captured stop error code to a service operating system to enable the service operating system to attempt to identify and repair problems leading to the operating system stop error.

7. The information handling system of claim 1, wherein the remedial action comprises communicating suggestions to a user of the information handling system to perform in an attempt to eliminate stop errors following a subsequent operating system boot of the information handling system.

8. A method comprising:
performing preboot stop error handling operations, wherein the preboot stop error handling operations include:
following a reboot of the information handling system and prior to booting an operating system, detecting a stop error code stored in a memory accessible to a basic input/output system, wherein the stop error code corresponds to an operating system stop error occurring prior to the reboot; and
responsive to detecting the stop error code:
reading the captured stop error code; and
performing a remedial action based on the stop error code.

9. The method of claim 8, wherein the preboot stop error handling operations include:
responsive to detecting no stop error code stored in the memory, allowing the information handling system to boot the operating system; and
in the event of an operating system stop error occurring following the boot of the operating system, and in concert with the operating system, capturing a stop error code corresponding to the operating system stop error and storing the stop error code in the memory.

10. The method of claim 8, wherein the remedial action comprises returning configuration settings of the basic input/output system to a known good configuration corresponding to a most recent successful boot of the operating system.

11. The method of claim 8, wherein the remedial action comprises initiating a basic input/output system firmware update.

12. The method of claim 8, wherein the remedial action comprises performing diagnostic tests to identify any hardware information handling resources of the information handling system that potentially caused the operating system stop error.

13. The method of claim 8, wherein the remedial action comprises communicating the captured stop error code to a service operating system to enable the service operating system to attempt to identify and repair problems leading to the operating system stop error.

14. The method of claim 8, wherein the remedial action comprises communicating suggestions to a user of the information handling system to perform in an attempt to eliminate stop errors following a subsequent operating system boot of the information handling system.

15. An article of manufacture comprising:
a non-transitory computer readable medium; and
computer-executable instructions carried on the computer readable medium, the instructions readable by a processor, the instructions, when read and executed, for causing the processor to, in a basic input/output system of an information handling system:
perform preboot stop error handling operations, wherein the preboot stop error handling operations include:
following a reboot of the information handling system and prior to booting an operating system, detecting a stop error code stored in a memory accessible to the basic input/output system, wherein the stop error code corresponds to an operating system stop error occurring prior to the reboot; and
responsive to detecting the stop error code:
reading the stop error code; and
performing a remedial action based on the stop error code.

16. The article of claim 15, wherein the preboot stop error handling operations include:
responsive to detecting no stop error code stored in the memory, allowing the information handling system to boot the operating system; and
in the event of an operating system stop error occurring following the boot of the operating system, and in concert with the operating system, capturing a stop error code corresponding to the operating system stop error and storing the stop error code in the memory.

17. The article of claim 15, wherein the remedial action comprises returning configuration settings of the basic input/output system to a known good configuration corresponding to a most recent successful boot of the operating system.

18. The article of claim 15, wherein the remedial action comprises initiating a basic input/output system firmware update.

19. The article of claim 15, wherein the remedial action comprises performing diagnostic tests to identify any hardware information handling resources of the information handling system that potentially caused the operating system stop error.

20. The article of claim 15, wherein the remedial action comprises communicating the captured stop error code to a service operating system to enable the service operating system to attempt to identify and repair problems leading to the operating system stop error.

21. The article of claim 15, wherein the remedial action comprises communicating suggestions to a user of the information handling system to perform in an attempt to eliminate stop errors following a subsequent operating system boot of the information handling system.

* * * * *